United States Patent [19]

Nienhaus et al.

[11] Patent Number: 5,670,600
[45] Date of Patent: Sep. 23, 1997

[54] AQUEOUS TWO-COMPONENT POLYURETHANE COATING COMPOSITION, PROCESS FOR ITS PREPARATION, AND ITS USE IN PROCESSES FOR THE PRODUCTION OF A MULTICOAT FINISH

[75] Inventors: Egbert Nienhaus, Ascheberg; Bernd Mayer, Münster; Uwe Meisenburg, Duisburg, all of Germany

[73] Assignee: BASF Lacke + Farben, AG, Muenster-Hiltrup, Germany

[21] Appl. No.: 564,145

[22] PCT Filed: Jun. 18, 1994

[86] PCT No.: PCT/EP94/01991

§ 371 Date: Dec. 20, 1995

§ 102(e) Date: Dec. 20, 1995

[87] PCT Pub. No.: WO95/02005

PCT Pub. Date: Jan. 19, 1995

[30] Foreign Application Priority Data

Jul. 3, 1993 [DE] Germany .................. 43 22 242.0

[51] Int. Cl.$^6$ .................................................... C08G 18/67
[52] U.S. Cl. ..................... 528/75; 528/81; 528/71; 525/123; 428/423.1; 427/402; 524/502
[58] Field of Search ................ 528/75, 81; 525/123; 428/423.1; 427/402; 524/502

[56] References Cited

U.S. PATENT DOCUMENTS

| | | | |
|---|---|---|---|
| 3,861,425 | 1/1975 | Clark | 138/149 |
| 4,079,028 | 3/1978 | Emmons et al. | 528/76 |
| 4,981,921 | 1/1991 | Blum et al. | 525/419 |
| 5,275,847 | 1/1994 | Schwarte | 427/407.1 |

FOREIGN PATENT DOCUMENTS

| | | | |
|---|---|---|---|
| WO 90/00570 | 7/1988 | European Pat. Off. | C08F 212/04 |
| 0 358 979 A2 | 8/1989 | European Pat. Off. | C09D 18/62 |
| 0 408 858 A1 | 5/1990 | European Pat. Off. | C09D 133/04 |
| 2295 048 | 12/1975 | France | C08F 220/18 |
| 41 32 430 A1 | 9/1991 | Germany | C09D 133/04 |

Primary Examiner—Rachel Gorr

[57] ABSTRACT

The present invention relates to an aqueous two-component polyurethane coating composition comprising A) a water-dilutable polyacrylate resin (A) having an OH number of from 40 to 200 mg of KOH/g, an acid number of from 20 to 100 mg of KOH/g and a glass transition temperature of from −40° C. to +60° C., and B) a polyisocyanate component as crosslinking agent, characterized in that the water-dilutable acrylate resin is obtainable by solution polymerization, in the presence of a polymerization initiator, of at least one monomer which is free of carboxyl groups, at least one monomer which contains hydroxyl groups, at least one vinyl ester of α-branched monocarboxylic acids having 5 to 18 carbon atoms per molecule and/or at least one reaction product of acrylic acid and/or methacrylic acid with the glycidyl ester of α-branched monocarboxylic acids having 5 to 18 carbon atoms per molecule, at least one monomer containing carboxyl groups and, if desired, other monomers which are essentially free of carboxyl groups, and after the end of the polymerization the resulting polyacrylate resin is at least partially neutralized and is dispersed in water.

20 Claims, No Drawings

AQUEOUS TWO-COMPONENT POLYURETHANE COATING COMPOSITION, PROCESS FOR ITS PREPARATION, AND ITS USE IN PROCESSES FOR THE PRODUCTION OF A MULTICOAT FINISH

The present application was filed under the provisions of 35 U.S.C 371(c) as the U.S. National Phase of PCT application PCT/EP/01991, filed Jul. 18, 1994.

The present invention relates to an aqueous two-component polyurethane coating composition comprising A) a water-dilutable polyacrylate resin (A) which contains hydroxyl and carboxylate groups and has an OH number of from 40 to 200 mg of KOH/g, preferably from 60 to 140 mg of KOH/g, an acid number of from 20 to 100 mg of KOH/g, preferably from 25 to 50 mg of KOH/g, and a glass transition temperature of from $-40°$ C. to $+60°$ C., preferably from $-20°$ C. to $+40°$ C., and B) a polyisocyanate component (B) as crosslinking agent.

The present invention also relates to a process for the preparation of these aqueous coating compositions and to their use in processes for the production of a multicoat finish, and to coated articles for which at least one coat has been produced using these coating compositions.

For ecological and economic reasons the paint industry is attempting to replace as much as possible of the organic solvents employed in coating materials by water. In motor vehicle finishing in particular there is a great requirement for aqueous coating materials. This applies both to the sector of automotive production-line finishing and to the sector of automotive refinishing. In this context aqueous coating compositions are employed in particular in the area of topcoats. Topcoats in this instance are understood as coating materials which are used to produce the topmost coating layer. This topmost coating layer may comprise one or more coats, in particular two coats. Two-coat topcoat finishes consist of a pigmented basecoat and, applied over the basecoat, a clearcoat which is free of pigment or is pigmented only with transparent pigments.

Two-coat finishes are currently produced by the wet-on-wet method, in which a pigmented basecoat is first applied, the resulting basecoat is coated over with a clearcoat, without a baking step, and subsequently basecoat and clearcoat are cured together. This method is very advantageous in economic terms but places severe demands on the basecoat and the clearcoat. The clearcoat applied to the as yet uncured basecoat must not start to dissolve the basecoat or interfere in any other way, since otherwise the finishes obtained are of poor appearance. This applies in particular to finishes for which the basecoats employed contain special-effect pigments (e.g. metallic pigments, especially aluminum flakes or pearlescent pigments). In addition, it must be possible to apply the topcoat compositions by spraying with the aid of automatic coating units. For this purpose the compositions must have a solids content at spray viscosity which is high enough to ensure that paint films obtained with 1 or 2 spray passes (cross passes) are of sufficient thickness, and they must give baked coating films which exhibit a good appearance (good evenness, high gloss, good topcoat holdout and a high degree of hardness) and good weathering resistance. In the area of automotive refinishing there is the additional requirement for the coating compositions employed to be fully curable at low temperatures (in general $\leq 80°$ C.) and also, on curing at these low temperatures, to lead to films having the good mechanical properties required.

EP-B-358 979 discloses aqueous two-component polyurethane coating compositions which contain a hydroxyl group-containing polyacrylate resin and a polyisocyanate component. These coating materials described in EP-B-358 979, however, show great disadvantages with respect to weathering resistance, in particular with respect to resistance under conditions of constant humidity (40° C., 240 h), and processability (drop in viscosity and deficient pot life).

Furthermore, DE-A-41 32 430 discloses aqueous coating materials and their use in automotive topcoats. These aqueous coating materials contain a water-dilutable polyacrylate resin and, as crosslinking agent, a blocked polyisocyanate. However, the use of blocked polyisocyanates in general necessitates the application of elevated baking temperatures, with the result that these aqueous coating materials are less suitable for the area of refinishing and instead are employed predominantly in the area of production-line finishing.

Moreover, DE-A 40 09 000 discloses a process for the production of a multicoat refinish, in which an aqueous topcoat based on a water-dilutable or water-dispersable emulsion polymer is employed. The water-dilutable binder described therein, however, is only employed in the physically drying basecoat.

Finally, EP-A-516 277 discloses aqueous two-component polyurethane coating materials which contain, as components essential to the invention, a polyether-modified polyisocyanate. These aqueous two-component coating materials contain as binder the polyacrylate resins conventionally employed. The use of the polyether-modified polyisocyanates, however, has the disadvantage that the resulting coatings exhibit only low weathering resistance, and in particular exhibit poor results in the constant-humidity test.

The object of the present invention is therefore to provide aqueous two-component polyurethane coating compositions based on polyacrylate resins which contain hydroxyl groups and on polyisocyanates and which, in comparison with the known, aqueous two-component polyurethane coating compositions, exhibit improved properties and/or give improved coating film. The new coating materials should in particular ensure reliable processing with a relatively long pot life, i.e. they should be processable for as long as possible in the ready-to-use state. Furthermore, the new coating materials should be suitable for the area of automotive refinishing, i.e. they should be fully curable at low temperatures (in general $\leq 80°$ C.) and should lead to coatings which meet at least the requirements conventionally placed on an automotive refinish. The coating composition should therefore, for example, exhibit good leveling, good mechanical properties and, in particular, good weathering resistance.

This object has surprisingly been achieved by aqueous two-component polyurethane coating compositions of the type indicated at the beginning which are characterized in that the water-dilutable acrylate resin (A) is obtainable by polymerizing, in an organic solvent or solvent mixture and in the presence of at least one polymerization initiator, (a1) a (meth)acrylic ester which is different from (a2), (a3), (a4) and (a6), is copolymerizable with (a2), (a3), (a4), (a5) and (a6) and is substantially free of carboxyl groups, or a mixture of such monomers, (a2) an ethylenically unsaturated monomer which is copolymerizable with (a1), (a2), (a3), (a4), (a5) and (a6), is different from (a4), carries at least one hydroxyl group per molecule and is essentially free of carboxyl groups, or a mixture of such monomers, (a3) one or more vinyl esters of α-branched monocarboxylic acids having, 5 to 18 carbon atoms per molecule, and/or (a4) at least one reaction product of acrylic acid and/or methacrylic acid with the glycidyl ester of an α-branched monocarboxylic acid having 5 to 18 carbon atoms per molecule or, instead of the reaction product, an equivalent quantity of acrylic and/or methacrylic acid which then, during or after the polymerization reaction, is reacted with the glycidyl ester of an α-branched monocarboxylic acid having 5 to 18 carbon atoms per molecule, (a5) an ethylenically unsaturated monomer which carries at least one carboxyl group per molecule and is copolymerizable with (a1), (a2), (a3), (a4) and (a6), or a mixture of such monomers, and (a6) if desired, an ethylenically unsaturated monomer which is copolymerizable with (a1), (a2), (a3), (a4) and (a5), is different from (a1), (a2), (a3) and (a4) and is essentially free of carboxyl groups, or a mixture of such monomers, and after the polymerization at least partially neutralizing the resulting polyacrylate resin and dispersing it in water, the nature and quantity of (a1), (a2), (a3), (a4), (a5) and (a6) being selected such that the polyacrylate resin (A) has the desired OH number, acid number and glass transition temperature.

The present invention also relates to a process for the preparation of the aqueous two-component polyurethane coating compositions, in which, shortly before application, the isocyanate group-containing crosslinking agent and the component containing the water-dilutable polyacrylate resin are mixed. Furthermore, the invention relates to a process for the production of a multicoat protective and/or decorative coating on a substrate surface, in which the compositions employed as topcoats are the aqueous coating compositions according to the invention, and to the coating articles obtained by this process. Finally, the present invention also relates to the use of the aqueous coating compositions and to the use of the water-dilutable polyacrylate resins according to the invention in aqueous coating compositions.

It is surprising and was not foreseeable that, by using the polyacrylate resins (A) according to the invention, aqueous two-component polyurethane coating materials are obtained which ensure reliable processing with a relatively long pot life, i.e. which are processible for a long time in the ready-to-use state. Further advantages are that the coating compositions according to the invention exhibit good leveling and lead to coatings having good mechanical properties, in particular good weathering resistance and good resistance in the constant humidity test.

In the text below, then, the individual components of the aqueous coating composition according to the invention are first described in more detail. The more detailed description of the preparation of the polyacrylate resins to be employed in accordance with the invention is preceded by two explanations of terms:

1. (Meth)acrylic acid is occasionally used as an abbreviation for "methacrylic acid or acrylic acid".
2. The formulation "essentially free of carboxyl groups" is intended to denote that components (a1), (a2), (a3), (a4) and (a6) may have a small content of carboxyl groups (but no more than to give a polyacrylate resin prepared from these components a maximum acid number of 10 mg of KOH/g). However, it is preferred for the carboxyl group content of components (a1), (a2), (a3), (a4) and (a6) to be kept as low as possible. Particular preference is given to employing (a1), (a2), (a3), (a4) and (a6) which are free of carboxyl groups.

Components (a1) employed in the preparation of the polyacrylate resins to be employed in accordance with the invention may be any ester of (meth)acrylic acid which is copolymerizable with (a2), (a3), (a4), (a5) and (a6, and is essentially free of carboxyl groups, or a mixture of such (meth)acrylic esters. Examples are alkyl acrylates and alkyl methacrylates having up to 20 carbon atoms in the alkyl radical, for example methyl, ethyl, propyl, butyl, hexyl, ethylhexyl, stearyl and lauryl acrylate and methacrylate and cycloaliphatic (meth)acrylic esters, for example cyclohexyl methacrylate. It is preferred to employ mixtures of alkyl acrylates and/or alkyl methacrylates as components (a1) which consist to the extent of at least 20% by weight of n-butyl and/or t-butyl acrylate and/or n-butyl and/or t-butyl methacrylate.

As component (a1) it is also possible to employ ethyltriglycol (meth)acrylate and methoxyoligoglycol (meth)acrylate having a number-average molecular weight of preferably 550, or other ethoxylated and/or propoxylated, hydroxyl group-free (meth)acrylic acid derivatives.

As component (a2) it is possible to employ any ethylenically unsaturated monomers which are copolymerizable with (a1), (a2), (a3), (a4), (a5) and (a6), are different from (a4), carry at least one hydroxyl group per molecule and are essentially free of carboxyl groups, or a mixture of such monomers. Examples are hydroxyalkyl esters of acrylic acid, methacrylic acid or another α,β-ethylenically unsaturated carboxylic acid. These esters may be derived from an alkylene glycol which is esterified with the acid, or they can be obtained by reacting the acid with an alkylene oxide. As component (a2) it is preferred to employ hydroxyalkyl esters of acrylic acid or methacrylic acid, in which the hydroxyalkyl group contains up to 20 carbon atoms, reaction products of cyclic esters, for example ε-caprolactone, and these hydroxyalkyl esters, or mixtures of these hydroxyalkyl esters and/or ε-caprolactone-modified hydroxyalkyl esters.

Examples of such hydroxyalkyl esters are 2-hydroxyethyl acrylate, 2-hydroxypropyl acrylate, 3-hydroxypropyl acrylate, 2-hydroxypropyl methacrylate, methacrylate, 2-hydroxyethyl 3-hydroxypropyl 4-hydroxybutyl methacrylate, 4-hydroxybutyl acrylate, methacrylate, hydroxystearyl acrylate and hydroxy- stearyl methacrylate. It is also possible to employ corresponding esters of other unsaturated acids, for example ethacrylic acid, crotonic acid and similar acids having up to about 6 carbon atoms per molecule. It is also possible to employ olefinically unsaturated polyols as component (a2). Preferred polyacrylate resins (A) are obtained if trimethylolpropane monoallyl ether is employed as at least part of component (a2). The proportion of trimethylol propane monoallyl ether is conventionally from 2 to 10% by weight, based on the overall weight of the monomers (a1) to (a6) employed in the preparation of the polyacrylate resin. In addition to this, however, it is also possible to add to the finished polyacrylate resin from 2 to 10% by weight, based on the overall weight of the monomers employed in the preparation of the polyacrylate resin, of trimethylolpropane monoallyl ether. The olefinically unsaturated polyols such as, in particular, trimethylolpropane monoallyl ether may be employed as the sole hydroxyl group-containing monomers, but are employed in particular as part of a combination with other of the hydroxyl group-containing monomers mentioned.

As component (a3), one or more vinyl esters of α-branched monocarboxylic acids having 5 to 18 carbon atoms in the molecule are employed. The branched monocarboxylic acids can be obtained by reacting formic acid or carbon monoxide and water with olefins in the presence of a liquid, strongly acid catalyst; the olefins may be products from the cracking of paraffinic hydrocarbons, such as mineral oil fractions, and may contain both branched and straight-chain acyclic and/or cycloaliphatic olefins. In the reaction of such olefins with formic acid or with carbon monoxide and water, a mixture is formed of carboxylic acids in which the carboxyl groups are located predominantly at a quaternary carbon atom. Examples of other olefinic starting materials are propylene trimer, propylene tetramer and diisobutylene. However, the vinyl esters can also be prepared in a manner known per se from the acids, for example by reacting the acid with acetylene. The employment of vinyl esters of saturated aliphatic monocarboxylic acids having 9 to 11 carbon atoms, which are branched at the alpha carbon atom, is particularly preferred because of their ready availability.

As component (a4), the reaction product of acrylic acid and/or methacrylic acid with the glycidyl ester of an α-branched monocarboxylic acid having 5 to 18 carbon atoms per molecule is employed. Glycidyl esters of heavily branched monocarboxylic acids are available under the trade name "Cardura". The reaction of acrylic or methacrylic acid with the glycidyl ester of a carboxylic acid having a tertiary alpha carbon atom can be carried out prior to, during or after the polymerization reaction. Preference is given to employing the reaction product of acrylic and methacrylic acid with the glycidyl ester of Versatic acid, as component (a4). This glycidyl ester is commercially available under the name "Cardura E10".

The monomer employed as component (a5) can be any ethylenically unsaturated monomer which carries at least one carboxyl group per molecule and is copolymerizable with (a1), (a2), (a3), (a4) and (a6), or a mixture of such monomers. It is preferred to employ acrylic and/or methacrylic acid as component (a5). However, it is also possible to employ other ethylenically unsaturated acids having up to 6 carbon atoms in the molecule. Examples of such acids are ethacrylic acid, crotonic acid, maleic acid, fumaric acid and itaconic acid. It is also possible to employ as component (a5) mono(meth)acryloyloxyethyl maleate, mono(meth) acryloyloxyethyl succinate and mono(meth) acryloyloxyethyl phthalate.

As component (a6) it is possible to employ all ethylenically unsaturated monomers which are copolymerizable with (a1), (a2), (a3), (a4) and (a5), are different from (a1), (a2), (a3) and (a4) and are essentially free of carboxyl groups, or mixtures of such monomers. Preference is given to employing vinyl aromatic hydrocarbons such as styrene, α-alkylstyrene and vinyltoluene as component (a6).

As component (a6) it is also possible to employ, in combination with other monomers mentioned as being suitable as component (a6), polysiloxane macromonomers. Suitable polysiloxane macromonomers are those having a number-average molecular weight of from 1,000 to 40,000, preferably from 2,000 to 10,000, and containing on average from 0.5 to 2.5, preferably from 0.5 to 1.5, ethylenically unsaturated double bonds per molecule. Examples of suitable polysiloxane macromonomers are those described in DE-A- 38 07 571 on pages 5 to 7, those described in DE-A 37 06 095 in columns 3 to 7, those described in EP-B 358 153 on pages 3 to 6 and those described in US-A 4,754,014 in columns 5 to 9. Also suitable are other acryloxysilane-containing vinyl monomers with the abovementioned molecular weights and contents of ethylenically unsaturated double bonds, for example compounds which can be prepared by reacting hydroxyfunctional silanes with epichlorohydrin and then reacting the reaction product with methacrylic acid and/or hydroxyalkyl esters of (meth)acrylic acid.

As component (a6) it is preferred to employ polysiloxane macromonomers of the following formula:

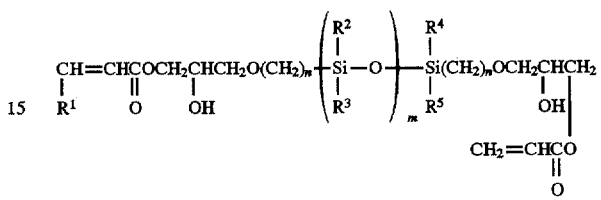

where $R^1$=H or $CH_3$ $R^2$, $R^3$, $R^4$, $R^5$=identical or different aliphatic hydrocarbon radicals having 1 to 8 carbon atoms, especially methyl, or the phenyl radical.

n=from 2 to 5, preferably 3 m=from 8 to 30

Particular preference is given to employing the α,ω-acryloxy-organofunctional polydimethylsiloxane of the formula

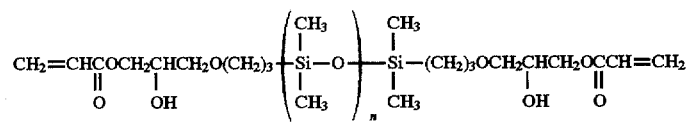

where n≈9, having an acryloxy equivalent of 550 g per equivalent, and an OH number of 102 mg of KOH/g and a viscosity of 240 mPas (25° C.).

Also preferably employed as component (a6) are polysiloxane macromonomers which have been prepared by reacting from 70 to 99,999 mol % of a compound (1), represented by the formula (I)

in which $R^1$ is an aliphatic hydrocarbon group having 1 to 8 carbon atoms or a phenyl radical and $R^2$, $R^3$ and $R^4$ are each a halogen radical or an alkoxy radical having 1 to 4 carbon atoms or a hydroxyl group, with from 30 to 0.001 mol % of a compound (2) represented by the formula (II)

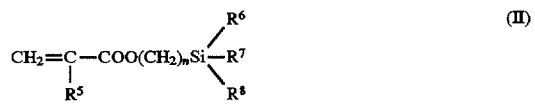

in which $R^5$ is a hydrogen atom or a methyl radical, , $R^6$, $R^7$ and $R^8$ are each halogen, OH- or an alkoxy radical having 1 to 4 carbon atoms, or an aliphatic hydrocarbon group having 1 to 8 carbon atoms, at least one of the radicals $R^6$, $R^7$ or $R^8$ being OH- or an alkoxy group and n representing an integer from 1 to 6.

Examples of suitable compounds (1) and (2) are specified in WO 92/22615 on page 13, line 18 to page 15, line 9.

The reaction between compounds (1) and (2) is effected by the dehydrating condensation of the hydroxyl groups present in these compounds and/or of the hydroxyl groups derived from the hydrolysis of the alkoxy groups of these compounds. Depending on the reaction conditions the reaction comprises, in addition to the dehydration reaction, a dealcohalizing [sic] condensation. If the compounds (1) or (2) contain halogen radicals, the reaction between (1) and (2) is effected by dehydrohalogenation.

The conditions under which the reaction between the compound (1) and the compound (2) is carried out are likewise described in the international patent application having the International Publication Number WO 92 22615, on page 15, line 23 to page 18, line 10.

The quantity of the polysiloxane macro monomer(s) (a6) employed to modify the acrylate copolymer (A) is less than 5% by weight, preferably from 0.05 to 2.5% by weight and particularly preferably from 0.05 to 0.8% by weight, based in each case on the overall weights of the monomers employed in the preparation of the copolymer (A).

The use of such polysiloxane macromonomers leads to an improvement in the slip of the aqueous polyurethane coating composition.

The nature and quantity of components (a1) to (a6) is selected such that the polyacrylate resin (A) has the desired OH number, acid number and glass transition temperature. Acrylate resins employed with particular preference are obtained by polymerizing a1) from 20 to 60% by weight, preferably from 30 to 50% by weight, of component (a1)

(a2) from 10 to 40% by weight, preferably from 15 to 35% by weight, of component (a2)

(a3) from 1 to 25% by weight, preferably from 5 to 15% by weight, of component (a3)

(a4) from 1 to 25% by weight, preferably from 5 to 15% by weight, of component (a4)

(a5) from 1 to 15% by weight, preferably from 2 to 8% by weight, of component (a5) and (a6) from 5 to 30% by weight, preferably from 10 to 20% by weight, of component (a6), the sum of the proportions by weight of components (a1) to (a6) being in each case 100% by weight.

The polyacrylate resins (A) employed in accordance with the invention are prepared in an organic solvent or solvent mixture and in the presence of at least one polymerization initiator. The organic solvents and polymerization initiators employed are those solvents and polymerization initiators which are conventional for the preparation of polyacrylate resins and which are suitable for the preparation of aqueous dispersions. Examples of solvents which can be used are butylglycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether, ethyl 2-hydroxypropionate and 3-methyl-3-methoxybutanol, and derivatives based on propylene glycol, for example ethyl ethoxypropionate, methoxypropyl acetate and the like.

Examples of polymerization initiators which can be used are initiators which form free radicals, for example t-butyl perethylhexanoate, benzoyl peroxide, azobisisobutyronitrile and t-butyl perbenzoate. The polymerization is expediently carried out at a temperature of from 80° to 160° C., preferably from 110° to 160° C. The solvents preferably employed are ethoxyethyl propionate and butyl acetate.

The polyacrylate resin (A) is preferably prepared by a two-stage process, since in this way the resulting aqueous coating compositions have a better processability. It is therefore preferred to employ polyacrylate resins which are obtainable by I. polymerizing a mixture of (a1), (a2), (a3), (a4) and (a6) or a mixture of portions of components (a1), (a2), (a3), (a4) and (a6) in an organic solvent, II. after at least 60% by weight of the mixture consisting of (a1), (a2), (a3), (a4) and, if desired, (a6) have been added, adding (a5) and any remaining amounts of components (a1), (a2), (a3), (a4) and (a6), and continuing polymerization, and III. after the end of polymerization, at least partially neutralizing the resulting polyacrylate resin and dispersing it in water.

In addition to this, however, it is also possible initially to charge components (a3) and/or (a4) together with at least a portion of the solvent and to meter in the remaining components. In addition, it is also possible to place only portions of components (a3) and/or (a4) in the initial charge, together with at least a portion of the solvent, and to add the remainder of these components as described above. Preferably, for example, the initial charge comprises at least 20% by weight of the solvent and about 10% by weight of component (a3) and (a4) and, if desired, portions of components (a1) and (a6). Also preferable is the preparation of the polyacrylate resins (A) employed in accordance with the invention by a two-stage process in which stage (I) lasts for from 1 to 8 hours, preferably from 1.5 to 4 hours, and the addition of the mixture of (a5) and any remaining amount of components (a1), (a2), (a3), (a4) and (a6) takes place over the course of from 20 to 120 min, preferably over the course of from 30 to 90 min. When the addition of the mixture of (a5) and any remaining amounts of components (a1), (a2), (a3), (a4) and (a6) is complete, polymerization is continued until all of the monomers employed have undergone essentially complete reaction.

The quantity and rate of addition of the initiator is preferably selected such that the resulting polyacrylate resin (A) has a number-average molecular weight of from 2,500 to 20,000. It is preferred to commence the addition of the initiator at the same time as the addition of the monomers, and to end it about half an hour after the addition of the monomers has been completed. The initiator is preferably added in a constant quantity per unit time. After the addition of initiator is complete the reaction mixture is held at polymerization temperature for a time (generally 1½ h) until all of the monomers employed have undergone essentially complete reaction. "Undegone essentially complete reaction" is intended to denote that preferably 100% by weight of the monomers employed have been reacted, but that it is also possible for a small residual monomer content of up to about 0.5% by weight maximum, based on the weight of the reaction mixture, to remain unreacted. The resulting polyacrylate resin (A) has an OH number of from 40 to 200, preferably from 60 to 140 mg of KOH/g, an acid number of from 20 to 100 mg of KOH/g, preferably from 25 to 50 mg of KOH/g, and a glass transition temperature of from −40 to +60° C., preferably from −20 to +40° C. This glass transition temperature can be calculated according to the following formula:

$$\frac{1}{Tg} \overset{n=x}{\underset{n=1}{\Sigma}} \frac{Wn}{Tgn}$$

Tg=glass transition temperature of the polyacrylate resin (A)

X=number of different monomers incorporated by polymerization in the polyacrylate resin Wn=proportion by weight of the nth monomer Tgn=glass transition temperature of the homopolymer of the nth monomer For the calculation of the glass transition temperature the Tg value of the homopolymer of the reaction product of acrylic and Cardura El 10 is taken to be equal to the glass transition temperature of the homopolymer of isodecyl methacrylate (–41° C.).

When the polymerization is complete the resulting polyacrylate resin is partially neutralized and dispersed in water. The degree of neutralization to be applied in each case depends on the acid number of the acrylate and is in general between 50 and 90% for acid numbers <70 mg of KOH/g and between 30 and 80% for acid numbers >70 mg of KOH/g. Both organic bases and inorganic bases can be used for neutralization. It is preferred to use primary, secondary and tertiary amines such as, for example, ethylamine, propylamine, dimethylamine, dibutylamine, cyclohexylamine, benzylamine, morpholine, piperidine, diethanolamine and triethanolamine. The neutralizing agents employed with particular preference are tertiary amines, especially dimethylethanolamine, triethylamine, dimethylisopropylamine, tripropylamine and tributylamine.

The neutralization reaction is generally carried out by mixing the neutralizing base with the polyacrylate resin. In this mixture the amount of base employed is preferably such that the topcoat composition has a pH of from 7 to 8.5, preferably from 7.2 to 7.8.

Subsequently, the partially or completely neutralized polyacrylate resin is dispersed by the addition of water to form an aqueous polyacrylate resin dispersion. If desired, some or all of the organic solvent can be removed by distillation. The polyacrylate resin dispersions according to the invention contain polyacrylate resin particles whose average particle size is preferably between 60 and 300 nm (measurement method: laser light scattering, measuring instrument Malvern Autosizer 2 C). The polyacrylate resin (A) employed in accordance with the invention is conventionally employed in the coating compositions in a quantity of from 30 to 50% by weight (calculated as solids content, i.e. without the water fraction), based on the overall weight of the coating composition.

Polyisocyanate component (B) is any organic polyisocyanate having free isocyanate groups which are attached to aliphatic, cycloaliphatic, araliphatic and/or aromatic structures. The polyisocyanates preferably employed have from 2 to 5 isocyanate groups per molecule and viscosities of from 200 to 2,000 mPas (at 23° C.). If desired, small amounts of organic solvent, preferably from 1 to 25% by weight based on pure polyisocyanate, may be added to the polyisocyanates in order to improve the ease of incorporation of the isocyanate and, if desired, to reduce the viscosity of the polyisocyanate to a value within the abovementioned ranges. Examples of solvents which are suitable as additives for the polyisocyanates are ethoxyethyl propionate, butyl acetate and the like.

Examples of suitable isocyanates are described in, for example, "Methoden der organischen Chemie", [Methods in Organic Chemistry], Houben-Weyl, volume 14/2, 4th edition, Georg Thieme Verlag, Stuttgart 1963, page 61 to 70, and by W. Siefken, Liebigs Ann. Chem. 562, 75 to 136. Suitable examples are 1,2-ethylene diisocyanate, 1,4-tetramethylene diisocyanate, 1,6-hexamethylene diisocyanate, 2,2,4- and 2,4,4-trimethyl-1,6-hexamethylene diisocyanate, 1,12-dodecanediiso-cyanate, x,x'-diisocyanatodipropyl ether, cyclobutane 1,3-diisocyanate, cyclohexane 1,3- and 1,4-diisocyanate cyanate, 2,2- and 2,6-diisocyanato-1-methylcyclohexane, 3-isocyanatomethyl-3,5,5-trimethylcyclohexyl isocyanate ("isophorone diisoyanate"), 2,5- and 3,5-bis(isocyanatomethyl)-8-methyl-1,4-methanodecahydronapthaline, 1,5-, 2,5-, 1,6- and 2,6-bis-(isocyanatomethyl)-4,7-methanohexahydroindane, 1,5-, 1,5-, 2,5-, 1,6- and 2,6-bis(isocyanato)-4,7-methanohexahydroindane, dicyclohexyl 2,4'- and 4,4'-diisocyanate, 2,4- and 2,6-hexahydrotolylene diisocyanate, perhydro-2,4- and -4,4'-diphenylmethane diisocyanate, x,x'-diisocyanato-1,4-diethylbenzene, 1,3- and 1,4-phenylene diisocyanate, 4,4'-diisocyanatobiphenyl, 4,4'-diisocyanato-3,3'-dichlorobiphenyl, 4,4'-diisocyanato-3,3'-dimethoxybiphenyl, 4,4'-diisocyanato-3,3'-dimethylbiphenyl, 4,4,-diisocyanato-3,3'-diphenylbiphenyl, 2,4'- and 4,4'-diisocyanatodiphenylmethane, naphthylene 1,5-diisocyanate, tolylene diisocyanates, such as and 2,6-tolylene diisocyanate, N,N'-(4,4'-dimethyl-3,3'-diisocyanatodiphenyl) uretdione, m-xylylene diisocyanate, dicyclohexylmethane diisocyanate, tetramethylxylylene diisocyanate, but also triisocyanates, such as 2,4,4'-triisocyanatodiphenyl ether and 4,4', 4"-triisocyanatotriphenylmethane. Other possibilities for employment are polyisocyanates containing isocyanurate groups and/or biuret groups and/or allophanate groups and/or urethane groups and/or urea groups. Polyisocyanates containing urethane groups are obtained, for example, by reacting some of the isocyanate groups with polyols, for example trimethylolpropane and glycerol. Preference is given to employing aliphatic or cycloaliphatic polyisocyanates, especially hexamethylene diisocyanate, dimerized and trimerized hexamethylene diisocyanate, isophorone diisocyanate, dicyclohexylmethane 2,4'-diisocyanate or dicyclohexylmethane methane 4,4'-diisocyanate, or mixtures of these polyisocyanates. It is very specially preferred to employ mixtures of polyisocyanates which contain uretdione and/or isocyanurate groups and/or allophanate groups and are based on hexamethylene diisocyanate, as are formed by the catalytic oligomerization of hexamethylene diisocyanate using appropriate catalysts. In addition, polyisocyanate component (B) may also comprise any desired mixtures of the polyisocyanates mentioned by way of example.

In order to prepare the ready-to-use aqueous two-component polyurethane coating composition, polyisocyanate component (B) is mixed with polyacrylate resin component (A) shortly before application. Further mixing can be effected simply by stirring at room temperature or otherwise by dispersion. In this mixture polyisocyanate component (B) is employed in a quantity such that the weight ratio of polyacrylate resin solids to polyisocyanate solids is from 60:40 to 90:10, particularly preferably from 70:30 to 85:15. The ratio of the number of free OH groups of component (A) to the number of isocyanate groups of component (B) in this context is usually in the range from 1:2 to 2:1.

The aqueous two-component polyurethane resin coating compositions according to the invention may also contain, in addition to the polyacrylate resin (A) employed in accordance with the invention, other crosslinked polymer microparticles as are disclosed, for example, in EP-A-38 127 and/or further compatible resins, for example water-dilutable or water-soluble polyacrylate resins, polyurethane resins, polyester resins, alkyd resins or epoxy resin esters. The proportion of these further resins is generally between 1 and 10% by weight, based on the overall weight of the coating composition. For example, up to 30% by weight, based on the binder solids content of polyacrylate resin (A), of an acrylate which is prepared by emulsion polymerization and has an OH number which is preferably between 40 and 200 mg of KOH/g may be added to the coating compositions according to the invention. The preparation of such emulsion polymers is described, for example, in DE-A 40 09 000, although the OH number of the acrylates must be increased correspondingly.

Furthermore, the coating compositions according to the invention may also contain other conventional auxiliaries and additives, such as, in particular, thickeners and wetting agents. A nonionic polyurethane thickening agent is preferably added to the aqueous coating compositions according to the invention, since such an agent leads to an improved transparency and improved emulsifiability of the polyisocyanate. Moreover, a wetting agent based on alkyl-modified polyether is preferably added to the aqueous coating compositions according to the invention, since such an agent likewise improves the transparency of the coating composition and the gloss and leveling of the coating composition. In addition to this, the aqueous coating compositions may also contain other conventional auxiliaries and additives, for example antifoams and the like. The quantity of auxiliaries and additives employed (incl. wetting agent and thickening agent) is generally between 1 and 5% by weight, based on the overall weight of the coating compositions.

The aqueous coating compositions according to the invention may also contain conventional organic solvents. The proportion of these is kept as low as possible. It is conventionally below 15% by weight, based on the overall content of volatile constituents.

The coating materials according to the invention are generally adjusted to a pH of between 6.5 and 9.0. The pH can be adjusted using conventional amines, for example triethylamine, dimethylaminoethanol and N-methylmorpholine.

The coating materials according to the invention can be applied to any desired substrates, for example metal, wood, plastic or paper, by conventional application methods, for example spraying, knife coating, brushing and dipping. The coating materials according to the invention are preferably employed for the production of topcoats. The coating materials according to the invention can be employed both in the production-line finishing and in the refinishing of car bodies. However, they are preferably employed in the area of refinishing. The aqueous coating compositions according to the invention can be used as fillers and for the production of single-coat finishes and as pigmented basecoats, or as clearcoats in a process for the production of a multicoat finish (basecoat/clearcoat method). However, the coating materials according to the invention are preferably employed as clearcoats.

If the coating materials according to the invention are employed for the production of single-coat finishes or as basecoats, then they may be pigmented with pigments, for example pigments based on inorganic compounds, for example titanium dioxide, iron oxide, carbon black, etc. and/or pigments based on organic compounds and/or metal pigments, for example aluminium bronzes and/or pearlescent or interference pigments. Aluminum bronzes and pearlescent or interference pigments are examples of special-effect pigments. If the coating compositions according to the invention are employed as pigmented basecoats, then they can be coated over with the coating materials according to the invention which contain no pigments or which have only transparent pigmentation, but they can also be coated over with conventional clearcoats based on organic solvents, with aqueous clearcoats or else with powder clearcoats.

The topcoat compositions according to the invention have a solids content at spray viscosity (from 20 to 50% by weight, preferably from 32 to 45% by weight) which is such that coating films obtained with 1 or 2 spray passes (cross passes) are of sufficient thickness (the thickness of the baked coating film should preferably be between 25 and 70 μm), and give coating films having a very good appearance (good evenness, high gloss, good topcoat holdout), good weathering resistance and good mechanical properties and have a relatively low proportion of organic co-solvents (less than 35% by weight, based on the overall solids content of binders and crosslinking agents).

If the topcoat compositions according to the invention are used together with water-dilutable basecoat compositions for the production of metallic finishes, then the metallic finishes obtained exhibit particularly good adhesion of the transparent topcoat to the basecoat. Examples of suitable basecoats are the aqueous basecoats described in DE-A 40 09 000. Also suitable are all aqueous basecoats conventionally employed.

In the following examples the invention is illustrated in more detail. All parts and percentages are by weight, unless expressly stated otherwise.

A1) Preparation of a water-dilutable polyacrylate resin (A1) employed in accordance with the invention 24 parts by weight of ethoxy ethyl propionate (EEP) and 10.0 parts by weight of Cardura E 10 (a4) are placed in a steel vessel fitted with monomer feed, iniator feed, thermometer, oil heating and reflux condenser, and are heated to 120° C.

A solution of 6.0 parts by weight of t-butyl perethylhexanoate in 6.0 parts by weight of ethoxyethyl propionate is then added at a rate such that the addition is concluded after 4 h 30 min.

The commencement of addition of the t-butyl perethylhexanoate solution is accompanied by the commencement of addition of the mixture of (a1) to (a6):

(a1): 20.0 parts by weight of n-butyl methacrylate, 16.0 parts by weight of methyl methacrylate, 10.0 parts by weight of ethylhexyl acrylate, (a6): 15.4 parts by weight of styrene, (a2): 22.0 parts by weight of hydroxyethyl methacrylate, and (a5): 6.6 parts by weight of acrylic acid.

The mixture of (a1), (a2), (a5) and (a6) is added at a rate such that the addition is concluded after 4 h. When the addition of the t-butyl perethylhexanoate solution is over, the reaction mixture is held at 120° C. for a further 2 h. The resin solution is then cooled to 80° C. and neutralized to a degree of neutralization of 60% using dimethylethanolamine, over the course of about 30 minutes. Subsequently water is added in a quantity such that the solids content of the dispersion is about 40% by weight.

Organic solvent is removed from this dispersion by azeotropic distillation in vacuo until not more than 3% (according to GC) can be detected. While the organic solvent was separated off, the water is returned to the reactor.

After completing the distillation, deionized water is added to the dispersion to bring about the following final characteristics: acid number of the overall solids content: 29 mg of KOH/g, solids content (in % by weight; 1 h, 130° C.): 39.0%.

A2) Preparation of a water-dilutable polyacrylate resin (A2) employed in accordance with the invention The procedure is analogous to the preparation of polyacrylate resin (A1), but with the following difference:

The commencement of the addition of the t-butyl perethylhexanoate solution is accompanied by the commencement of addition of the mixture of (a1), (a2), (a3), (a4) and (a6):

(a1): 18.0 parts by weight of n-butyl methacrylate, 14.0 parts by weight of methyl methacrylate, 8.0 parts by weight of ethylhexyl acrylate, (a6): 13.4 parts by weight of styrene, (a2): 20.0 parts by weight of hydroxyethyl methacrylate.

After two hours a second monomer feed is started with the remainder of the mixture of (a1), (a2) and (a6), and 6.6 parts by weight of acrylic acid (a5). After 4 h the addition of monomer is complete and the reaction mixture is held at 120° C. for a further 2 h.

Further working up is carried out analogously to the preparation of (A1).

A3) Preparation of a water-dilutable polyacrylate resin A3 (comparison, in analog to Example 2 of EP-B-358 979

24 parts by weight of ethoxyethyl propionate (EEP) are placed in a steel vessel fitted with monomer feed, initiator feed, thermometer, oil heating and reflux condenser, and are heated to 120° C.

A solution of 6.0 parts by weight of t-butyl perethylhexanoate in 6.0 parts by weight of ethoxyethyl propionate is then added at a rate such that the addition is concluded after 4 h 30 min.

The commencement of the addition of the t-butyl perethylhexanoate solution is accompanied by the commencement of the addition of the mixture of (a1) to (a6):

(a1): 42.0 parts by weight of n-butyl acrylate, 16.0 parts by weight of methyl methacrylate, (a2): 32.0 parts by weight of hydroxyethyl methacrylate (a5): 10.0 parts by weight of acrylic acid. The mixture of (a1), (a2) and (a5) is added at the rate such that the addition is concluded after 4 h. After the end of addition of the t-butyl perethylhexanoate solution the reaction mixture is held at 120° C. for a further 2 h. The resin solution is then cooled to 80° C. and neutralized to a degree of neutralization of 50%, using dimethylethanolamine, over the course of about 30 minutes. Subsequently a quantity of water is added such that the solids content of the dispersion is approximately 40% by weight.

Organic solvent is removed from this dispersion by azeotropic distillation in vacuo until not more than 3% (according to GC) can be detected. Whereas the organic solvent was separated off, the water is returned to the reactor.

After the end of the distillation, deionized water is added to the dispersion to bring about the following final characteristics: acid number of the overall solids content: 77 mg of KOH/g, solids content (in % by weight; 1 h, 130° C.): 37.0%.

A4) Preparation of a water-dilutable polyacrylate resin (A4) (comparison)

24 parts by weight of ethoxyethyl propionate (EEP) are placed in a steel vessel fitted with monomer feed, initiator feed, thermometer, oil heating and reflux condenser, and are heated to 120° C.

A solution of 6.0 parts by weight of t-butyl perethylhexanoate in 6.0 parts by weight of ethoxyethyl propionate is then added at a rate such that the addition is concluded after 4 h 30 min.

The commencement of addition of the t-butyl perethylhexanoate solution is accompanied by the commencement of addition of the mixture of (a1) to (a6):

(a1): 21.0 parts by weight of n-butyl methacrylate, 16.0 parts by weight of methyl methacrylate, 10.0 parts by weight of ethylhexyl acrylate, (a6): 16.5 parts by weight of styrene, (a2): 32.0 parts by weight of hydroxyethyl methacrylate, (a5): 4.5 parts by weight of acrylic acid.

The mixture of (a1), (a2), (a5) and (a6) is added at a rate such that the addition is concluded after 4 h. After the end of addition of the t-butyl perethylhexanoate solution the reaction mixture is held at 120° C. for a further 2 h. The resin solution is then cooled to 80° C. and is neutralized to a degree of neutralization of 80%, using dimethylethanolamine, over the course of about 30 minutes. Then water is added in a quantity such that the solids content of the dispersion is approximately 40% by weight.

Organic solvent is removed from this dispersion by azeotropic distillation in vacuo until not more than 3% (according to GC) can be detected. Whereas the organic solvent was separated off, the water is returned to the reactor.

After the end of the distillation, deionized water is added to the dispersion to bring about the following final characteristics: acid number of the overall solids content: 35 mg KOH/g, solids content (in % by weight; 1 h, 130° C.): 38.0%.

TABLE 1

Composition (in parts) and characteristics of the water-dilutable polyacrylate resins (A1) and (A2) employed in accordance with the invention and of the polyacrylate resins (A3) and (A4) (comparison)

|  | Resin (A1) | Resin (A2) | Resin (A3) | Resin (A4) |
|---|---|---|---|---|
| Method | 1-stage | 2-stage | 1-stage | 1-stage |
| SV | 30 | 30 | 30 | 30 |
| Cardura E 10 | 10 | 10 | — | — |
| n-BMA | 20 | 20 | — | 21 |
| n-BA | — | — | 42 | — |
| MMA | 16 | 16 | 16 | 16 |
| Styrene | 15.4 | 15.4 | — | 16 |
| EHA | 10 | 10 | — | 10 |
| HEMA | 22 | 22 | 32 | 32 |
| AA | 6.6 | 6.6 | 10 | 4.5 |

TABLE 1-continued

Composition (in parts) and characteristics of the water-dilutable polyacrylate resins (A1) and (A2) employed in accordance with the invention and of the polyacrylate resins (A3) and (A4) (comparison)

|  | Resin (A1) | Resin (A2) | Resin (A3) | Resin (A4) |
|---|---|---|---|---|
| TBPEH (30% strength) | 6.0 | 6.0 | 6.0 | 6.0 |
| Poly-FC (theor.) | 70 | 70 | 70 | 70 |
| OHN | 117 | 117 | 135 | 135 |
| AN | 29 | 29 | 77 | 39 |
| Visc. (50% BuAC) [dPas] | 4.1 | 4.0 | 8.0 | 6.0 |
| Degree of neutralization | 60% (DMEA) | 60% (DMEA) | 50% (DMEA) | 80% (DMEA) |
| FC (%), pH | 39.0; 7.8 | 41.4; 7.4 | 37.0; 7.5 | 38.0; 7.6 |
| Tg (°C.) | 31 | 31 | 6 | 47 |

Explanations for Table 1

| | |
|---|---|
| SV | Solvent; the solvent employed was a mixture of 8 parts of butyl acetate and 1 part of ethoxyethyl propionate. |
| Cardura E 10 | Glycidyl ester of Versatic acid |
| n-BMA | n-Butyl methacrylate |
| n-BA | n-Butyl acrylate |
| MMA | Methyl methacrylate |
| EHA | Ethylhexyl acrylate |
| HEMA | Hydroxyethyl methacrylate |
| AA | Acrylic acid |
| TBEH | t-Butyl perethylhexanoate |
| Poly-FC | Polymerization solids content |
| OHN | OH number in mg KOH/g |
| AN | Acid number in mg KOH/g |

B) Preparation of transparent aqueous topcoat compositions according to the invention Transparent topcoat compositions are prepared from 65.0% by weight of the acrylate dispersion (A1) or (A2) or (A3) or (A4) prepared in accordance with section A, 15.0% by weight of an 80% strength solution of a commercially available water-dilutable polyisocyanate resin in ethyl ethoxypropionate, based on hexamethylene diisocyanate dimer/trimer and containing uretdione groups (commercial product Desmodur® N 3400 from Bayer AG), 40% by weight of a commercially available polyurethane thickening agent (Dapral T 210 from Akzo), 15.0 parts by weight of distilled water and 1.0 part by weight of a commercially available wetting agent based on an alkyd-modified polyether (commercial product Triton X100 from Rohm & Haas) and 0.06 part by weight of a silicone-based surface-active agent (commercial product Byk 331 from Byk), and these topcoat compositions are adjusted using distilled water to spray viscosity (24 s efflux time from the DIN 4 cup (according to DIN 53 211, 1974)).

C) Application of the transparent topcoat compositions according to the invention and testing of the baked coating films A water-dilutable basecoat composition pigmented with aluminum flakes, in accordance with EP-A279 813, is applied to a phosphatized steel panel coated with a commercially available electrodeposition coating and a commercially available filler such that a dry film thickness of from 12 to 15 μm results. The applied basecoat composition is dried for 10 min at room temperature and for 10 min at 60° C. A topcoat composition obtained according to section B) is then sprayed onto the basecoat in two cross passes with an intermediate flash-off time of 15 min. Finally the panel is dried at room temperature for 30 min and baked at 60° C. for 30 min in a circulating-air oven. The resulting multicoat finishes were subjected to a number of tests. The test results are shown in Table 2.

TABLE 2

| | Test results | | | | | | | |
|---|---|---|---|---|---|---|---|---|
| | Example 2 | | Example 2 | | Comp. Example 1 | | Comp. Example 2 | |
| | before testing | after testing | before testing | after testing | before testing | after testing | before testing | after testing |
| Acrylate dispersion | (A1) | | (A2) | | (A3) | | (A4) | |
| Solids content[1] | 40% | | 39% | | 39% | | 35% | |
| Coat thickness (μm)[2] | 50 | | 50 | | 50 | | 50 | |
| Crosshatch[3] | 0 | 0–1 | 0 | 0–1 | 0 | 1–2 | 0 | 0–1 |
| CC test[4] blistering | 0 | m5/g1 | 0 | m5/g1 | 0 | m5/g3 | 0 | m5/g3 |
| swelling | 0 | 3 | 0 | 3 | 0 | 5 | 0 | 5 |
| WS test[5] blistering | 0 | 0 | 0 | 0 | 0 | m5/g2[5] | 0 | m3/g2 |
| (5 cycles) swelling | 0 | 2–3 | 0 | 2 | 0 | 5[5] | 0 | 4 |
| König pendulum hardness RT | 94 | | 90 | | 75 | | 115 | |
| 90' 60° C. | 111 | | 115 | | 110 | | 130 | |
| Gloss[6] | 85 | | 88 | | 88 | | 86 | |
| Processing time[7] | 120 | | 120 | | 30 | | 150 | |

TABLE 2-continued

| | Test results | | | | | | | |
|---|---|---|---|---|---|---|---|---|
| | Example 2 | | Example 2 | | Comp. Example 1 | | Comp. Example 2 | |
| | before testing | after testing | before testing | after testing | before testing | after testing | before testing | after testing |
| Efflux viscosity[8] | | | | | | | | |
| t = 0 | | 25 | | 25 | | 25 | | 25 |
| 30 min | | 21 | | 25 | | 17 | | 25 |
| 60 min | | 20 | | 24 | | 15 | | 24 |
| 120 min | | 20 | | 23 | | 15 | | 24 |

Explanations for Table 2

[1] The application solids content, in percent by weight, was determined at 1 h and 130° C.
[2] The value given is the thickness of the transparent, fully cured topcoat.
[3] The crosshatch test was carried out in accordance with DIN 53 151, including the adhesive tape tear-off test.
[4] The constant-climate test was carried out in accordance with DIN 50 017 with constant climatic conditions at 40° C. for 240 h.
[5] The water spray test was carried out by spraying the coated substrates with deionized water for 240 h at 20° C., in alternation with regeneration of 24 h at 20° C. In the comparison example the test was terminated after only 2 cycles, in Example 1 and 2 the result after 5 cycles is given.
[6] The degree of gloss was determined at an angle of 20° in accordance with DIN 67 530.
[7] The processing time should be understood as the time over which the material, after being brought together, can still be processed such that the resulting coatings have the required profile of properties.
[8] Efflux viscosity The efflux viscosity of the 2C-polyurethane system in the finished formulation was determined using the DIN 4 cup.

We claim:

1. An aqueous two-component polyurethane coating composition, comprising
an aqueous dispersion of a polyacrylate resin having an OH number of from 40 to 200 mg of KOH/g, an acid number of from 20 to 100 mg of KOH/g, and a glass transition temperature of from −40° C. to +60° C.; and
a polyisocyanate component as crosslinking agent;
wherein the polyacrylate resin comprises, as polymerized monomer units,
a1) one or more esters selected from the group consisting of esters of acrylic acid, esters of methacrylic acid, and mixtures thereof;
a2) one or more ethylenically unsaturated monomers having at least one hydroxyl group per molecule;
a3) optionally one or more vinyl esters of α-branched monocarboxylic acids having 5 to 18 carbon atoms per molecule, a4) optionally at least one compound selected from the group consisting of reaction products of acrylic acid, methacrylic acid, and mixtures thereof with glycidyl esters of α-branched monocarboxylic acids having 5 to 18 carbon atoms per molecule, wherein said reaction products may be formed prior to, during, or after polymerization of the polyacrylate resin;
a5) one or more ethylenically unsaturated monomers having at least one carboxyl group per molecule; and
a6) optionally one or more additional ethylenically unsaturated monomers;
and further wherein at least one of (a3) and (a4) is included in the polyacrylate resin; and yet further wherein the monomers of (a1), (a2), (a3), (a4), (a5), and (a6) are all different and copolymerizable with one another, and the monomers of (a1), (a2), and (a6) are substantially free of carboxyl groups.

2. An aqueous coating composition according to claim 1, wherein the aqueous dispersion of the polyacrylate resin is obtained by
(I) polymerizing a mixture of components (a1), (a2), at least one of (a3) and (a4)/and, optionally, (a6) in an organic solvent,
(II) after polymerization of at least 60% by weight of the mixture, adding (a5) and any remaining amounts of the mixture and continuing polymerization, and
(III) after the end of polymerization, at least partially neutralizing the resulting polyacrylate resin and dispersing it in water.

3. An aqueous coating composition according to claim 2, wherein the polymerization of stages (I) and (II) are carried out at a temperature of from 80° to 160° C., and further wherein the stage (I) polymerization lasts for from 1 to 8 hours, and addition and continued polymerization of stage (II) lasts for from 20 to 120 minutes.

4. An aqueous coating composition according to claim 1, wherein component (a2) includes trimethylol propane monoallyl ether, component (a3) is one or more vinyl esters of α-branched, saturated aliphatic monocarboxylic acids having 9 to 11 carbon atoms, component (a4) is a compound selected from the group consisting of the reaction products of acrylic acid, methacrylic acid, and mixtures thereof with the glycidyl ester of versatic acid.

5. An aqueous coating composition according to claim 1, wherein the polyacrylate resin consists essentially of, as polymerized monomer units,
a1) 20 to 60% by weight of component (a1)
a2) 10 to 40% by weight of component (a2)
a3) 1 to 25% by weight of component (a3)
a4) 1 to 25% by weight of component (a4)
a5) 1 to 15% by weight of component (a5) and
a6) 5 to 30% by weight of component (a6).

6. An aqueous coating composition according to claim 1, further comprising a thickener.

7. A process for application of an aqueous two-component polyurethane coating composition, comprising mixing, shortly before application, an isocyanate group-containing crosslinking agent and a polyacrylate resin prepared according to claim 1.

8. A process for the production of a multicoat coating on a substrate comprising the steps of
(1) applying a pigmented basecoat composition to the substrate surface, (2) forming a polymer film from the composition applied in stage (1), (3) applying to the resulting basecoat, as a transparent aqueous topcoat composition, an aqueous coating composition according to claim 1, and subsequently (4) curing the basecoat together with the topcoat.

9. A coated article having a multicoat finish, wherein at least one of the coats has been produced using an aqueous coating composition according to claim 1.

10. An automotive refinish coating composition comprising the aqueous coating compositions according to claim 1.

11. An aqueous coating composition according to claim 1, wherein the polyacrylate resin has an OH number of from 60 to 140 mg KOH/g, an acid number of from 25 to 50 mg of KOH/g, and a glass transition temperature of from −20° C. to +40° C.

12. An aqueous coating composition according to claim 1, wherein (a4) is included in the polyacrylate resin by polymerizing a monomer selected from the group consisting of acrylic acid, methacrylic acid, and mixtures thereof, and during or after the polymerization reaction reacting the acid with the glycidyl ester of an α-branched monocarboxylic acid having 5 to 18 carbon atoms per molecule.

13. An aqueous coating composition according to claim 2, wherein stages (I) and (II) are carried out at a temperature of from 110° to 160° C., and further wherein the stage (I) polymerization lasts for from 1.5 to 4 hours, and the addition and continued polymerization of stage (II) lasts for from 30 to 90 minutes.

14. An aqueous coating composition according to claim 4, wherein (a4) is included in the polyacrylate resin by polymerizing a monomer selected from the group consisting of acrylic acid, methacrylic acid, and mixtures thereof, and during or after the polymerization reaction, reacting the acid with the glycidyl ester of versatic acid.

15. An aqueous coating composition according to claim 1, wherein the polyacrylate resin is obtained from a1) 30 to 50% by weight of component (a1)

a2) 15 to 35% by weight of component (a2)

a3) 5 to 15% by weight of component (a3)

a4) 5 to 15% by weight of component (a4)

a5) 2 to 8% by weight of component (a5) and a6) 10 to 20% by weight of component (a6).

16. An aqueous coating composition according to claim 1, further comprising a wetting agent.

17. An aqueous coating composition according to claim 16, wherein the wetting agent is an alkyl group-containing polyether.

18. An aqueous coating composition according to claim 6, wherein the thickener is a non-ionic polyurethane resin.

19. An aqueous coating composition according to claim 1, further comprising a thickener based on a non-ionic polyurethane resin, and a wetting agent that is an alkyl group-containing polyether.

20. An automotive refinish topcoating composition comprising the aqueous coating composition according to claim 1.

* * * * *